Jan. 15, 1963 R. G. RULLMAN 3,074,021

CRYSTAL DISCRIMINATOR

Filed April 3, 1958

INVENTOR.
ROBERT G. RULLMAN

BY Walter J. Kreske
ATTORNEY

United States Patent Office 3,074,021

Patented Jan. 15, 1963

3,074,021

CRYSTAL DISCRIMINATOR

Robert G. Rullman, Lexington, Mass., assignor to General Electronic Laboratories, Inc., Cambridge, Mass., a corporation of Massachusetts Filed Apr. 3, 1958, Ser. No. 726,231
5 Claims. (Cl. 329—117)

This invention relates to circuits for converting electric oscillatory signals to direct current voltage signals whose instantaneous values depend on the oscillatory signal frequency, and more particularly to such conversion circuits using crystals therein and which produce characteristic voltages proportional to the frequency deviation from a selected reference frequency and which will be herein referred to as crystal discriminators.

A primary problem in crystal discriminators heretofore available was the expensive nature of the circuits involved A principal cause for this expense has been the degree of precision with which the crystals involved had to be finished and with which the components affecting the tuning of the circuits had to be selected. Even small variations in crystal dimensions, or small inductive or capacitive variations in the components of the circuit have an effect on both the position and the slope of the output voltage characteristics of the circuit with respect to selected reference signal frequencies. Even the commercial tolerances involved in the components result in response changes which were undesirable and could not be tolerated and for which it was necessary to undertake expensive dimensional control in the case of crystals and which required repetitive trial and error selection in the case of other circuit components.

Pursuant to the present invention, a crystal discriminator has been devised which overcomes this need for such expensive degree of precision in crystals and components heretofore required without impairing the desired precision in operating characteristics of the descriminator. In addition to the above, the present invention also achieves other desirable features and advantages. Among these other features and advantages are a crystal discriminator which permits the making of rapid compensating adjustments for variations in crystal dimensions. It also permits the making of rapid compensating adjustments for component tolerance variations such as occur between one capacitor component and another of the same commercial rating. A still further advantageous feature achieved by the present invention is an inherent ability for shifting the voltage output response characteristic with respect to frequency. It may also be used to vary the slope in the curve in a graph of output voltage versus frequency. Additionally, it may be used for both shifting the voltage response characteristic and varying the slope to a precisely desired position.

Accordingly, a primary object of the present invention is the provision of a crystal discriminator having the desirable characteristics of a discriminator made with high precision components, but in fact using components with ordinary commercial tolerances.

Another object is the provision of a crystal discriminator which has the low-cost advantages of using conventional commercial tolerance components and the operational advantages of components made to an expensive degree of precision.

And a further object is the provision of a crystal discriminator whose voltage output response slope may be shifted or varied with respect to a reference frequency.

And a still further object is the provision of a crystal discriminator which has a characteristic voltage output versus frequency slope which may be both shifted and varied or rotated with respect to a reference signal frequency.

And another object is the provision of a crystal discriminator which may be rapidly compensated for tolerance variations in components as well as dimensional variations in the crystals to achieve operation equivalent to that with precision component selection and crystal dimensioning.

And a further object is the provision of a crystal discriminator which is relatively simple and inexpensive to manufacture and is rugged and reliable in its operation.

These objects, features and advantages are achieved generally by providing a pair of frequency-tuned crystal circuits having peak response characteristics in opposed and displaced relation to each other, variable capacitors in said circuits for providing tuning adjustment which both compensates for component tolerances and tuning peak shift, and an added circuit for adding the outputs of the frequency-tuned pair of crystal circuits.

By providing a common ground line and a variable capacitor coupled from one of the crystals to the ground line, suitable compensation and shifting of one of the response peaks may be achieved.

By providing a variable capacitor for each of the crystals coupled to the respective crystal and the ground line, both suitable shifting of the characteristic voltage output slope, as well as changing the characteristics output slope with respect to a selected frequency signal reference is thereby achieved.

By providing a unidirectional current valve such as a diode across the capacitor in each of the crystal detector circuits and a pair of adder resistors across both of the diodes, with the output terminal at the junction of the resistors, a suitable arrangement for adding the output of each of the crystal detector circuits is thereby achieved.

These features, objects and advantages will become more apparent from the following description taken in connection with the accompanying drawings of a preferred embodiment of the invention, and wherein.

Figure 1:
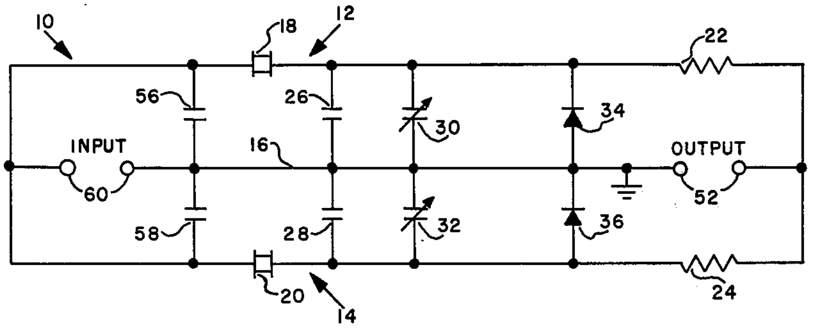
FIG. 1 is a schematic diagram of the preferred embodiment of the invention.

Referring to FIG. 1 in more detail, a schematic diagram of a crystal discriminator constructed in accordance with the present invention is designated generally by the numeral 10. The discriminator 10 has a pair of tuned crystal circuits 12 and 14 respectively with a common grounded line 16. Each of the tuned circuits 12 and 14 includes a crystal 18 and 20 respectively, preferably of the natural quartz variety. Each of the crystals 18 and 20 is connected in parallel with the ground line 16 and in series with adder resistors 22 and 24 respectively. Coupled between the crystal and adder resistor to the ground line 16 in each of the circuits 12 and 14 are fixed capacitors 26 and 28, variable trimmer capacitors 30 and 32 and diodes 34 and 36 respectively. The capacitors 26 and 30 in the circuit 12 are proportioned for providing with the crystal 18, a tuned circuit having, across the output terminals 52, a response voltage characteristic shown by a curve 38 in FIG. 2 with a peak response 40 at a selected center frequency 42. Similarly, the capacitors 28 and 32 are proportioned to provide a tuned circuit 14 with the crystal 20 having a response characteristic shown by the curve 44 in FIG. 2 with a peak response 46 at a selected center frequency 48 displaced from the center frequency 42 by a selected bandwidth 50 for purposes to be hereinafter further described. Thus, the resulting response across the output terminals 52 is represented by a curve 54 which is the algebraic sum of the response curves 38 and 44 respectively.

Capacitors 56 and 58 coupled between the ground line 16 and the input 60 side of the crystals 18 and 20 respectively are provided for proper impedance match and tuning for signal input equipment coupled across the input terminals 60. The capacitors 56 and 58 may be dispensed with where proper tuning is provided in the signal input equipment coupled to the input terminals 60.

In the operation of the crystal discriminator 10, frequency modulation signals are applied across the input terminals 60 to the tuned crystal circuits 12 and 14 respectively. Because of the natural inductive and capacitive characteristics of the crystals 18 and 20, together with associated capacitors 26 and 30, 28 and 32 respectively in the circuits 12 and 14 and the diodes 34 and 36, a voltage response will appear at the output terminals 52 which is the algebraic sum of the characteristic output voltage of each of the circuits 12 and 14 for the given frequency.

The characteristic output at any such frequency may be found from the curve 54. In the event that it is desired to shift the cross-over point 62 of the curve 54 on the zero voltage axis 64, the capacitance of the trimming capacitor 30 may be varied to shift the peak output 40 in one direction to the position 66 or in the other direction to the position 68 to new center frequencies 70 or 72 respectively. In similar manner, varying the capacitive value of variable capacitor 32, effects a shift in the peak output 46 of the curve 54 to the position 74 of the position 76 as desired, and thereby to new center frequencies 78 or 80 respectively. Such shift in center frequencies causes a corresponding change in the position and slope of the curve 54. For example, a shift in the direction of the center frequencies 70 and 78 would produce a response curve 82 substantially parallel to curve 54 and having a cross-over point 84 displaced to the left of the cross-over point 62. Thus, the response curve 82 would have substantially the same slope as the response curve 54. In similar manner, a shift to the center frequencies 72 and 80 would cause a new response characteristic curve 86 with a cross-over point 88 to the right of the response curve 54 but having substantially the same slope.

On the other hand, the slope may be varied by adjusting the capacitors 30 and 32 in the direction of the center frequency 70 and the center frequency 80 to thereby produce a response characteristic curve 90 which while different in slope from the characteristic curve 54 has substantially the same crossover point 62. Likewise, the slope may be rotated in the opposite direction by an adjustment toward the center frequencies 72 and 78 respectively.

It is seen that such adjustments and variations in the response characteristic curve of the crystal discriminator 10 provides a flexible arrangement wherein the circuit may be adapted for very exacting requirements without the need for making physical dimensional changes in the crystals 18 or 20. Such adjustments may likewise be used to compensate for tolerance variations in other components used.

Figure 2:
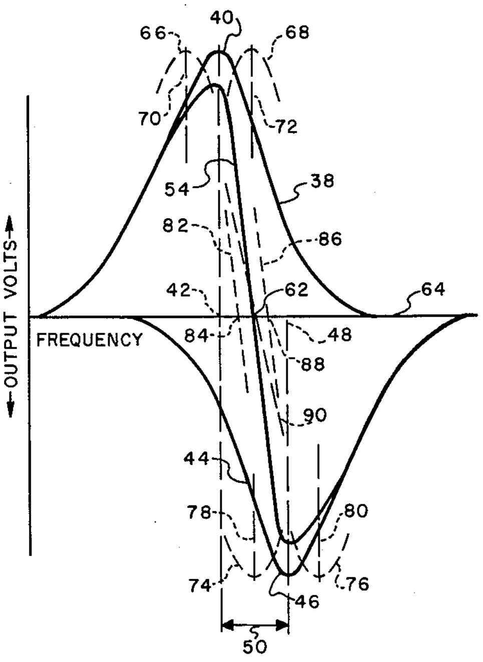
FIG. 2 is a graph for more clearly illustrating operation of the embodiment shown in FIG. 1.
Figure 3:
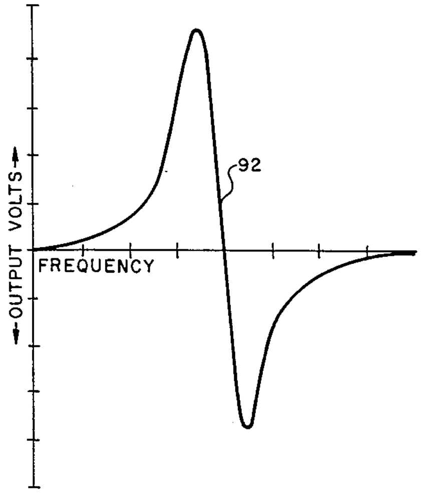
FIG. 3 is a representative or characteristic graph illustrating output of a discriminator made in accordance with FIG. 1 under actual use conditions.

The extreme linearity of output which may be obtained, as shown in the characteristic output curve 54 in FIG. 2, is demonstrated by the curve 92 in FIG. 3 obtained by actual tests under actual working conditions of an embodiment constructed in accordance with the FIG. 1 illustration.

Where long periods of use are contemplated, protection of the discriminator circuit 10 from atmospheric conditions may be obtained preferably by hermetically sealing in a suitable plastic material such as methyl methacrylate known commercially as Lucite. Also, the crystal discriminator 10 may be used with a constant temperature oven in conventional manner to provide increased stability of operation.

This invention is not limited to the specific details of construction and operation described as equivalents will suggest themselves to those skilled in the art.

What is claimed is:

1. A crystal discriminator circuit comprising a pair of crystals, a pair of input terminals, a pair of output terminals, and a ground terminal, one of the terminals of said input and output pairs coupled to the ground terminal, a pair of capacitors across said input terminals, one of said crystals in series with an adder resistor and said other input and output terminals of said pairs, the other of said crystals in series with another adder resistor and said other input and output terminals of said pairs, a pair of parallel connected capacitors coupled to said one crystal and ground, another pair of parallel connected capacitors coupled to said other crystal and ground, one of each of said pairs of parallel connected capacitors being a variable trimmer capacitor, a uni-directional current means across said first mentioned pair of parallel connected capacitors, and oriented for passing current to ground, and a uni-directional current means across said other pair of parallel coupled capacitors and oriented for passing current away from ground.

2. A crystal discriminator circuit comprising a pair of crystals, a pair of input terminals and a pair of output terminals, one of the terminals of said input and output pairs coupled to ground, an adder resistor in series with one of said crystals coupled across the other of the terminals of said input and output pairs, another added resistor in series with the other crystal coupled across the other of the terminals of said input and output pairs, a pair of parallel coupled capacitors connected to said one crystal and ground, another pair of parallel coupled capacitors connected to said other crystal and ground, one of each of said pairs of parallel coupled capacitors being a variable trimmer capacitor, a diode across said first mentioned pair of parallel coupled capacitors and oriented for passing current to ground, and a diode across said other pair of parallel coupled capacitors and oriented for passing current away from ground.

3. In combination, a pair of frequency-tuned crystal circuits each having a crystal with the peak response characteristics of one in opposed and displaced relation to the peak response characteristics of the other, a separately adjustable variable capacitor in each of said circuits for providing separate tuning peak adjustment for each of said circuits, a common ground connection for said circuits, each of said variable capacitors being coupled between the crystal and ground connection in the respective circuit, and electric signal adder means coupled to both the circuits for providing a continuous summation output for said circuits.

4. In combination, a pair of frequency-tuned crystal circuits each having a crystal with the peak response characteristics of one in opposed and displaced relation to the peak response characteristics of the other, a separately adjustable variable capacitor in each of said circuits for providing separate tuning peak adjustment for each of said circuits, a diode across the capacitor in each of the circuits, and electric signal adder means comprising a pair of adder resistors coupled across said diodes and having an output terminal at the junction of said resistors for providing a continuous summation output for said circuits.

5. In combination, a pair of frequency-tuned crystal circuits each having a crystal with the peak response characteristics of one in opposed and displaced relation to the peak response characteristics of the other, a separately adjustable variable capacitor in each of said circuits for providing separate tuning peak adjustment for each of said circuits, a unidirectional current valve for each of said variable capacitors with the respective unidirectional current valve alone coupled across its associated capacitor as a parallel connection with the capacitor, and electric signal adder means coupled to both the circuits for providing a continuous summation output for said circuits.

References Cited in the file of this patent

UNITED STATES PATENTS

| | | |
|---|---|---|
| 1,794,932 | Usselman | Mar. 3, 1931 |
| 2,286,378 | Roberts | June 16, 1942 |
| 2,374,735 | Crosby | May 1, 1945 |
| 2,594,091 | Summerhayes | Apr. 22, 1952 |
| 2,607,890 | Petroff | Aug. 19, 1952 |
| 2,686,871 | Reiches | Aug. 17, 1954 |
| 2,724,089 | Ruston | Nov. 15, 1955 |